Dec. 6, 1966 J. C. SIMS, JR 3,290,511
HIGH SPEED ASYNCHRONOUS COMPUTER
Filed Aug. 19, 1960 6 Sheets-Sheet 1
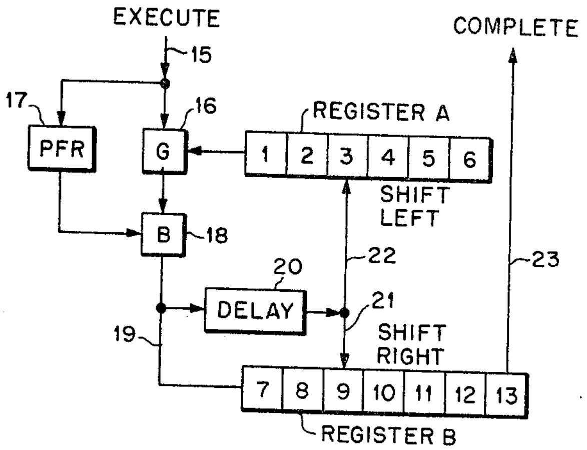
Fig. 1
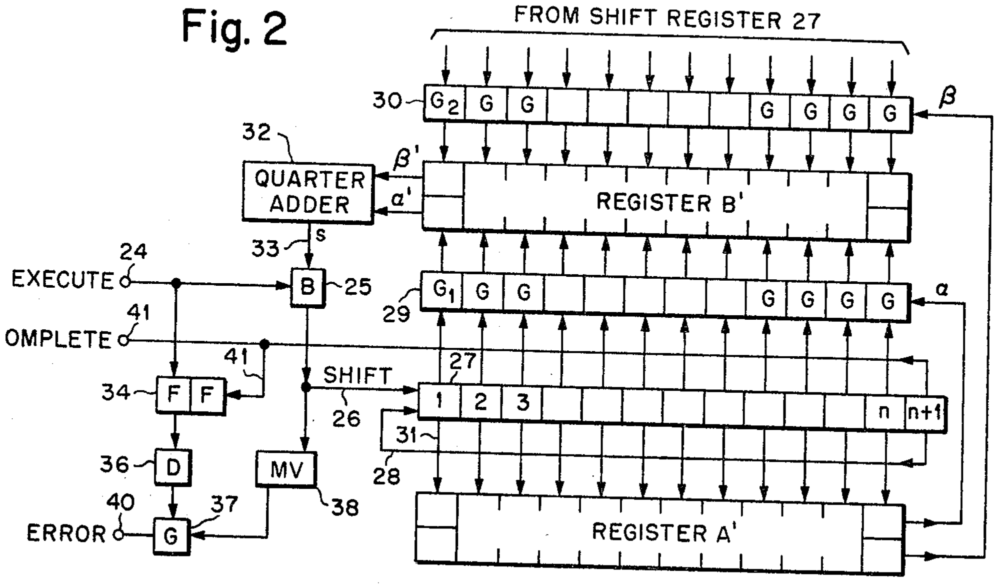
Fig. 2
| MAJORITY ORGAN | | | |
|---|---|---|---|
| INPUT | | | OUTPUT |
| a | b | c | d |
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |
Fig. 3c
| "AND" GATE | | |
|---|---|---|
| INPUT | | OUTPUT |
| a | b | c |
| 0 | 0 | 0 |
| 0 | 1 | 0 |
| 1 | 0 | 0 |
| 1 | 1 | 1 |
Fig. 3a
| BUFFER | | |
|---|---|---|
| INPUT | | OUTPUT |
| a | b | c |
| 0 | 0 | 0 |
| 1 | 0 | 1 |
| 0 | 1 | 1 |
| 1 | 1 | 1 |
Fig. 3b
| QUARTER ADDER | | |
|---|---|---|
| INPUT | | OUTPUT |
| a | b | c |
| 0 | 0 | 0 |
| 0 | 1 | 1 |
| 1 | 0 | 1 |
| 1 | 1 | 0 |
Fig. 3d
*INVENTOR.*
JOHN C. SIMS, JR.
Fred Fisher
*ATTORNEY*

| INPUT 2-LINE | | MEANING |
|---|---|---|
| A | B | |
| 0 | 0 | NOTHING |
| 0 | 1 | ZERO |
| 1 | 0 | ONE |
| 1 | 1 | EXCLUDED |
Fig. 4a
| GATE-BUFFER | | |
|---|---|---|
| INPUT | | OUTPUT |
| A | B | C |
| 00 | 00 | 00 |
| 01 | 00 | 00 |
| 10 | 00 | 01 |
| 00 | 10 | 01 |
| 00 | 01 | 00 |
| 01 | 10 | 01 |
| 01 | 01 | 10 |
| 10 | 10 | 01 |
| 10 | 01 | 01 |
Fig. 4b
| "NOT" GATE | | |
|---|---|---|
| INPUT | | OUTPUT |
| A | $\bar{B}$ | C |
| 00 | 00 | 00 |
| 01 | 00 | 00 |
| 10 | 00 | 01 |
| 00 | 01 | 00 |
| 00 | 10 | 01 |
| 01 | 01 | 10 |
| 01 | 10 | 01 |
| 10 | 01 | 01 |
| 10 | 10 | 01 |
Fig. 4c
| DOUBLE-LINE ADDER | | | | | | | | | |
|---|---|---|---|---|---|---|---|---|---|
| A | | B | | C | | S | | D | |
| a | a' | b | b' | c | c' | s | s' | d | d' |
| 0 | 0 | 0 | 0 | 0 | 0 | 0 | 0 | 0 | 0 |
| 0 | 1 | 0 | 1 | 0 | 1 | 0 | 1 | 0 | 1 |
| 1 | 0 | 0 | 1 | 0 | 1 | 1 | 0 | 0 | 1 |
| 0 | 1 | 1 | 0 | 0 | 1 | 1 | 0 | 0 | 1 |
| 1 | 0 | 1 | 0 | 0 | 1 | 0 | 1 | 1 | 0 |
| 0 | 1 | 0 | 1 | 1 | 0 | 1 | 0 | 0 | 1 |
| 1 | 0 | 0 | 1 | 1 | 0 | 0 | 1 | 1 | 0 |
| 0 | 1 | 1 | 0 | 1 | 0 | 0 | 1 | 1 | 0 |
| 1 | 0 | 1 | 0 | 1 | 0 | 1 | 0 | 1 | 0 |
Fig. 5a
| CONVENTIONAL ADDER | | | | |
|---|---|---|---|---|
| A | B | C | S | D |
| - | - | - | - | - |
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |
Fig. 5b
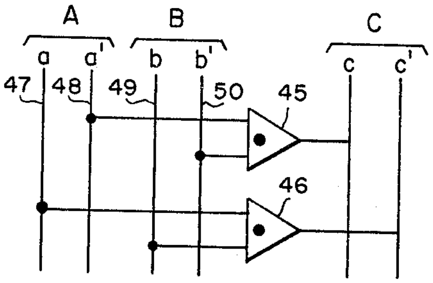
Fig. 6a
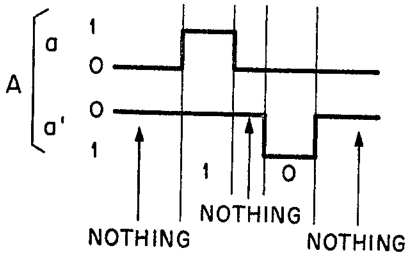
Fig. 6b
*INVENTOR.*
JOHN C. SIMS, JR.
*ATTORNEY*

Dec. 6, 1966 J. C. SIMS, JR 3,290,511

HIGH SPEED ASYNCHRONOUS COMPUTER

Filed Aug. 19, 1960

6 Sheets-Sheet 3

*INVENTOR.*
JOHN C. SIMS, JR.

*ATTORNEY*

INVENTOR.
JOHN C. SIMS, JR.

ATTORNEY

INVENTOR.
JOHN C. SIMS, JR.

ATTORNEY

INVENTOR.
JOHN C. SIMS, JR.
ATTORNEY

United States Patent Office 3,290,511

Patented Dec. 6, 1966

3,290,511
HIGH SPEED ASYNCHRONOUS COMPUTER
John C. Sims, Jr., Sudbury, Mass., assignor to Sperry Rand Corporation, New York, N.Y., a corporation of Delaware
Filed Aug. 19, 1960, Ser. No. 50,761
3 Claims. (Cl. 307—88)

The present invention relates to computer structures, to components for use in such structures, and to logical circuitry of more general application; and is more particularly concerned with improved computer circuits adapted for higher speeds of operation than has been the case heretofore.

Computers of the binary digital type, generally, are designed for synchronous operation, i.e. the overall computer and the several logical elements thereof are designed to operate on a fixed time scale determined by a clock source forming an inherent part of the computer. This clock source is necessary in such known computers due to certain inherent characteristics of the computers themselves. By way for example, it should be noted that the logical units utilized in such computers are capable of producing "spike" outputs, i.e. transient momentary outputs occurring during and in response to changing signals at the input of said component. One typical spiking operation occurs in conventional NOT gates normally forming an element of known logical networks; such NOT gates desirably operate to produce an output when an input occurs at one terminal thereof, while no output is to be produced when an input occurs at two terminals thereof. It will be appreciated, however, that any misalignment in pulses occurring at the two inputs of such a NOT gate cause a spike output to occur during the period of misalignment; and this spike output could, in the absence of other control units, disturb or disrupt the operation of the overall computer by causing a spurious undesired signal to occur at a time when no signal should in fact be present.

In order to eliminate errors due to the occurrence of spikes similar to those mentioned previously, known synchronous computers are clocked, as mentioned. For example, clocked gates are provided throughout the overall logical network to assure that only those signals which appear during precise times are valid signals, whereby spikes are ignored or prevented from otherwise disturbing or affecting the computer operation. The synchronous machines thus operate, as already mentioned, on a fixed time scale whereby the several logical elements of the overall computer are permitted to respond to only those signals which occur during precisely defined time intervals, and the several logical elements in turn produce valid usable signals only during other precisely defined time intervals.

While such clocking concepts do permit the computer to operate accurately, they have the appreciable disadvantage of slowing down the overall computer operation. In particular, the repetition rate of the clock in a synchronous device is and must be determined by the operating speed of the slowest element in its worse condition. As a result, the operation speed of the computer is fixed and cannot exceed the highest speed of the slowest circuit used in the computer. The time required for a program step is determined by the clocked interval, and not by the actual time in which a given logical component could perform the program step, in the absence of clocking. In order to increase the speed of operation of the overall unit, therefore, it is desirable to eliminate clock sources of the types employed heretofore, whereby each element of the computer is permitted to operate at its maximum speed, with the result that the speed of the overall equipment is the average maximum speed of the several components making up that equipment.

This comparatively greater increase in speed is, indeed, the result of several factors. First, by eliminating clock sources, the unclocked circuits can operate at their maximum average speed rather than at a speed which is determined solely by the clock interval. Second, by recognizing that the several logical components need not operate on the fixed and predetermined time scale of a clock system, the computer circuits can be readily redesigned for their new operating conditions whereby they can operate at a speed in excess of that which might otherwise be permissible in a clocked system.

The present invention is primarily concerned with the provision of a computer, and logical components for such a computer, capable of asynchronous operation, whereby the increased speed mentioned previously can be effected. As will become apparent from the subsequent discussion, such asynchronous operation contemplates the provision of a test as an inherent part of each logical operation, to determine and define just when that logical operation is finished. Upon completion of each such operation, the asynchronous device moves at once to the next operation. Each operation can thus take place immediately upon completion of the preceding operation; therefore, the time required for a program step is determined, not by a clocked interval, but by the actual time it takes for operation. The faster that one order is executed, the sooner that the next one can be undertaken.

In practice, those who are concerned with digital computer design usually spend more time with resynchronization and retiming considerations than with any other operation. In clocked or synchronous systems, the clock repetition rate is forced downward by retiming delays, by clock rate time jitter, and by allowances for poor rise time in the circuits due to aging and quality control tolerances of the parts and power supplies. By the time all of these variables have been taken into account, the clock frequency usually is depressed well below its theoretical maximum, whereby the overall system necessarily operates at a much slower speed than would otherwise be the case if the system could be permitted to operate asynchronously.

As has been mentioned previously, known logical computers could not be permitted to operate asynchronously, i.e. the clock sources could not merely be eliminated, without disrupting the operation of the overall system. If such clock sources were to be merely removed from synchronous systems in an attempt to secure asynchronous operation, the several components and logical circuits making up the overall computer would produce spikes from time to time; and the computer would be unable to determine of itself when a signal appearing at some point therein is a valid signal and when it is a spike signal which is to be rejected. The mere elimination of clock sources from known synchronous devices would therefore immediately result in a myriad of spurious circulating spikes which would cause the machine to break down from an accuracy and reliability point of view. In order to obviate this characteristic of synchronous machines, it is therefore necessary to so redesign the machine and the several logical components thereof that no spikes can occur.

This spike-free operation is accomplished in accordance with the preferred embodiment of the present invention through the utilization of a system of notation which uses two lines. In particular, binary digital machines of presently known types normally operate with what might be termed "single-line logic," i.e., a binary one is represented by a potential state on a single line (for example, a high potential); while a binary zero is similarly represented by another potential state on a single line (for example, a low potential). The present invention, in effecting the desired spike-free operation which is necessary in an asynchronous machine, operates on what will be termed hereinafter as "double-line logic," i.e., a binary one or a binary zero is represented by relative potential states on two lines, wherefore the device is capable of distinguishing between binary one, binary zero and "nothing." As will become apparent from the subsequent discussion, such use of double-line logic effectively doubles the size of the equipment which is required; and by the same token doubles the cost of the overall equipment. However, this increase in size and cost of the equipment is more than compensated for by the increase in speed which is effected; and an asynchronous computer designed in accordance with the present invention will have a speed which is substantially increased over the speed of a synchronous computer of comparable ability.

It is accordingly an object of the present invention to provide an asynchronous computer of improved design.

A further object of the present invention resides in the provision of an asynchronous computer operating in double-line logic.

A further object of the present invention resides in the provision of a computer capable of exceedingly high speeds of operation.

Still another object of the present invention resides in the provision of a computer and of components for such a computer which is time-independent in operation and which operates to initiate each program step immediately upon termination of a preceding program step.

Still another object of the present invention resides in the provision of a computer and components for such a computer which is operative to check the presence of predefined valid information on a digit-by-digit basis throughout a program of logical operation.

A still further object of the present invention resides in the provision of a computer and of components for such a computer which is operative to effect a given bit operation only upon valid completion of a preceding bit operation, and which is capable of distinguishing between the presence and absence of valid information.

Still another object of the present invention resides in the provision of improved logical circuits which are spike-free in operation.

A still further object of the present invention resides in the provision of an improved logical unit forming a basic component for conversion of known logical systems from operation in single-line logic to operation in double-line logic.

A still further object of the present invention resides in the provision of a system employing double-line logic wherein the relative potentials occurring on a pair of input lines corresponds to predefined valid and invalid information, wherefore the overall unit can immediately determine whether or not valid information is present at any given portion thereof.

Still another object of the present invention resides in the provision of a validity checker for determining when valid information occurs at any given point in a logical network.

The foregoing objects, advantages, construction and operation of the present invention will become more readily apparent from the following description and accompanying drawings, in which:

FIG. 1 is a block diagram illustrating a self-propagated asynchronous operation of the type contemplated by the present invention.

FIG. 2 is a block diagram illustrating an asynchronous operation performed in double-line logic in accordance with the present invention.

FIGS. 3A through 3D inclusive are truth tables illustrating the operation of known logical components.

FIGS. 4A through 4C are truth tables illustrating the double-line logic employed in the practice of the present invention.

FIGS. 5A and 5B are further truth tables comparing full binary addition in double-line and single-line logic respectively.

FIG. 6A is a logical diagram of a basic element constructed in accordance with the present invention for operation in the double-line logic employed in the present invention.

FIG. 6B comprises waveforms illustrating signals employed in the double-line logic of the present invention.

Figure 7A:
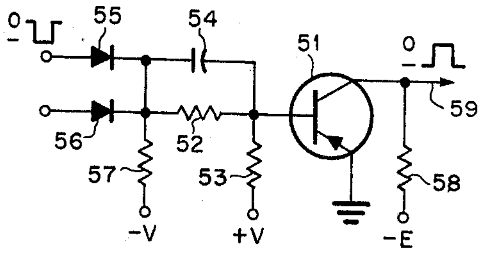
Figure 7B:
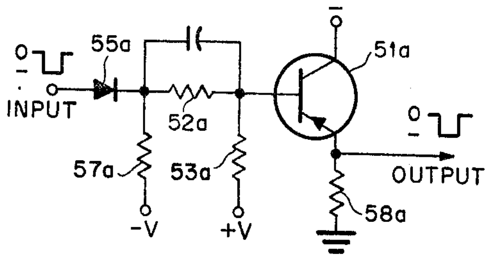

FIGS. 7A and 7B are schematic diagrams illustrating complementing and non-complementing amplifier circuits which may be employed in this invention.

Figure 8:
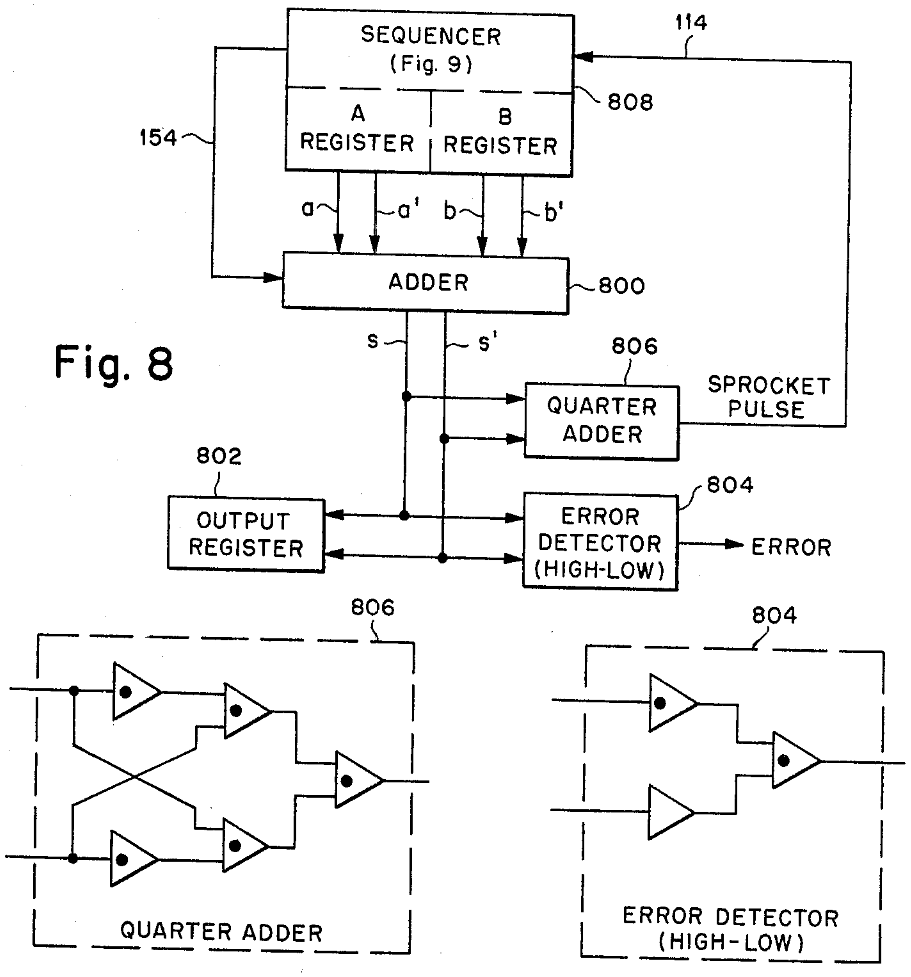

FIG. 8 is a block diagram of an asynchronous binary adder in combination with sequencing and control means constructed in accordance with the present invention.

Figure 9:
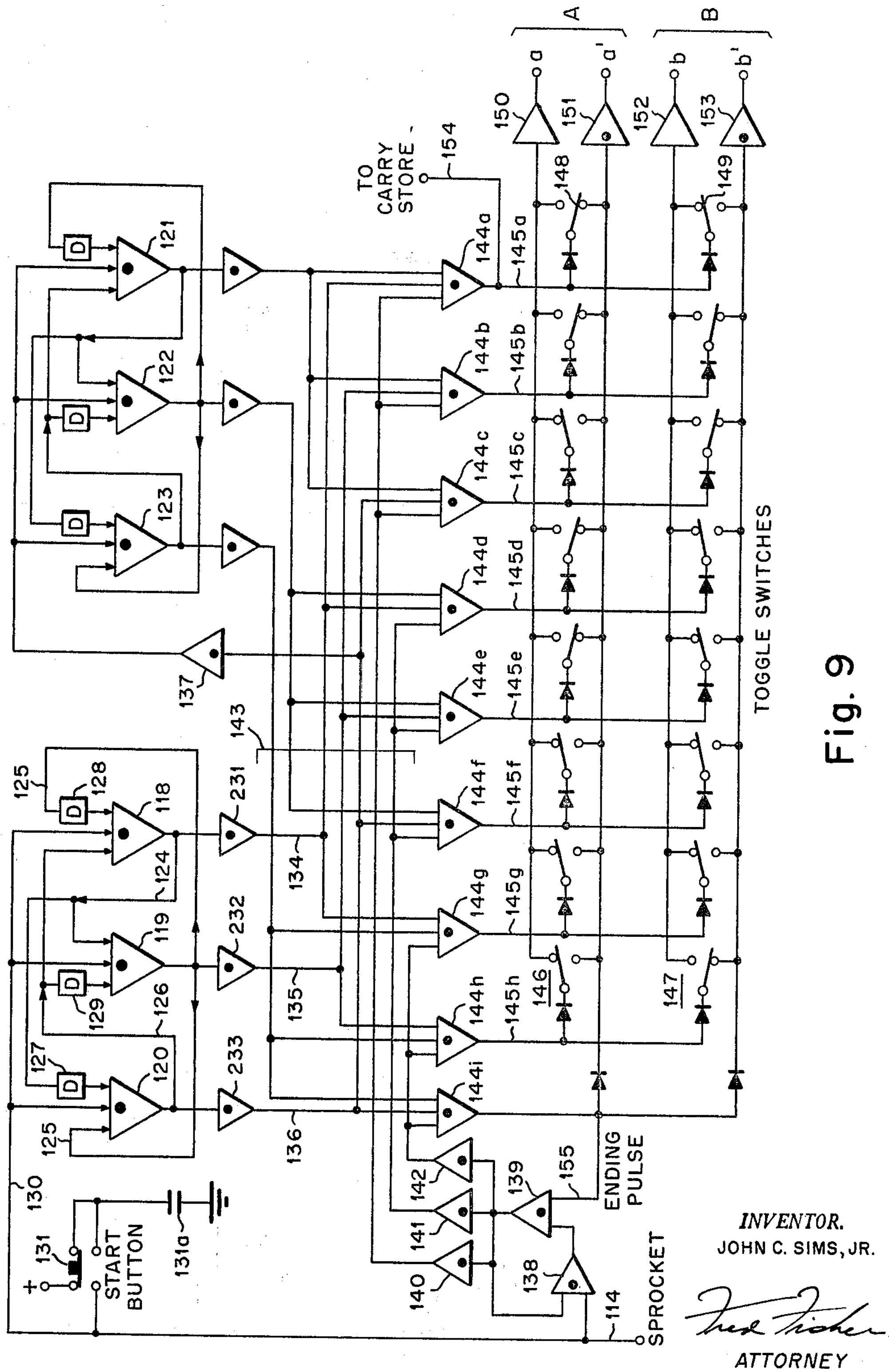

FIG. 9 is a logical diagram of a word sequencer constructed in accordance with the present invention for operation with the adder of FIG. 8.

Figure 10:
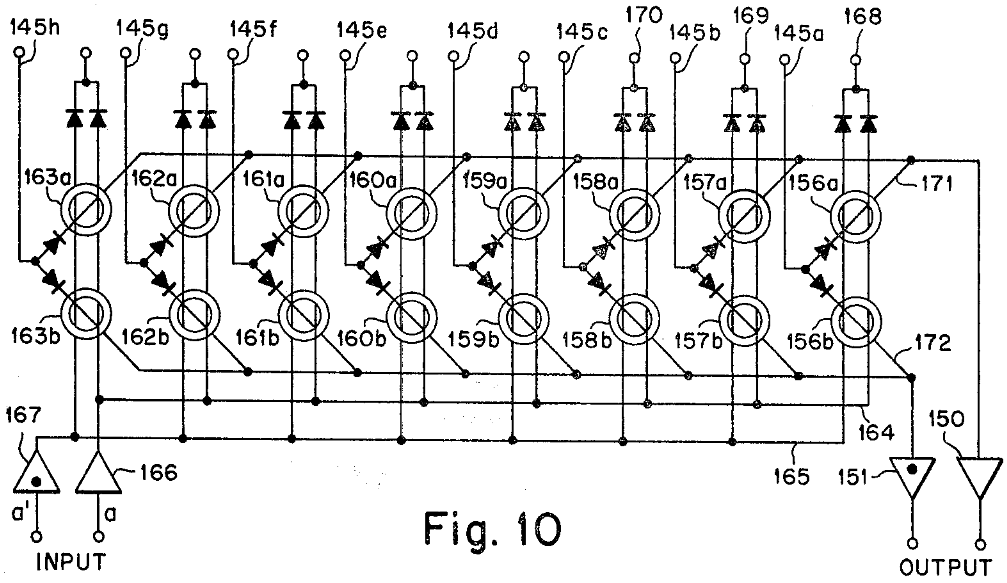

FIG. 10 is a schematic diagram of a two-line asynchronous serial register, such as may be employed in the present invention.

Figure 11:
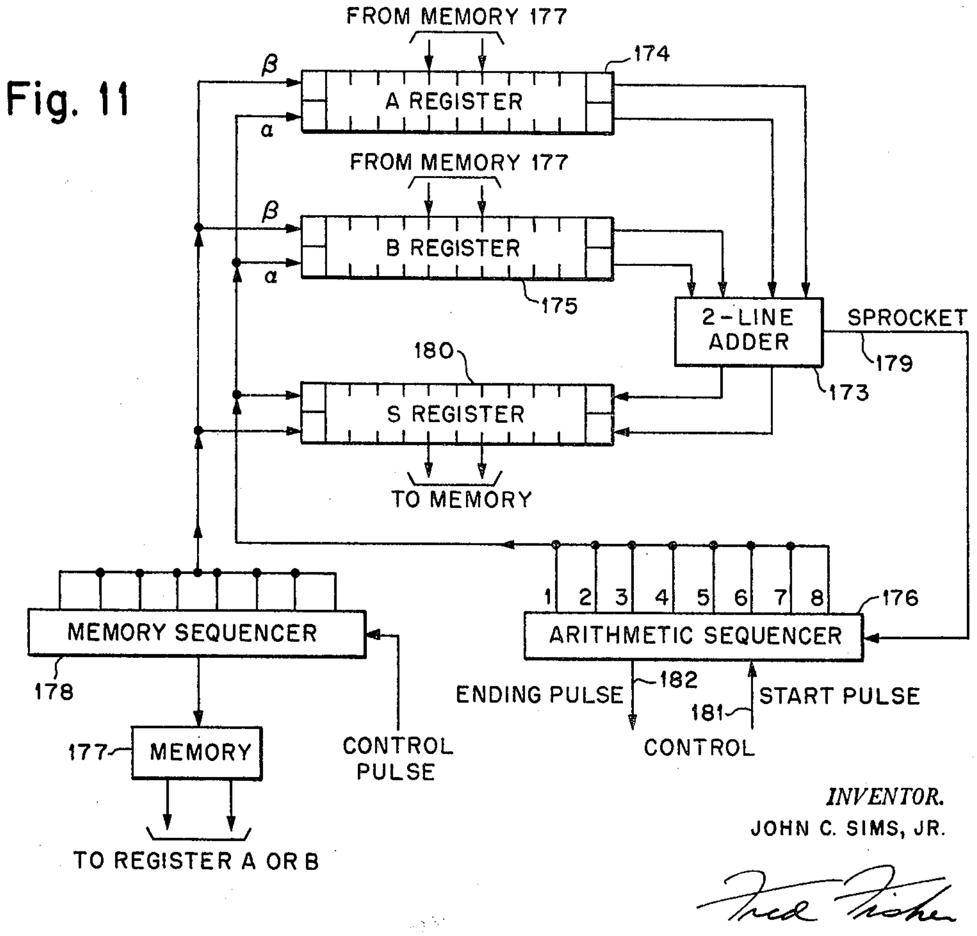

FIG. 11 is a block diagram of an interconnected two-line asynchronous adder and registers constructed in accordance with the present invention.

Figure 12:
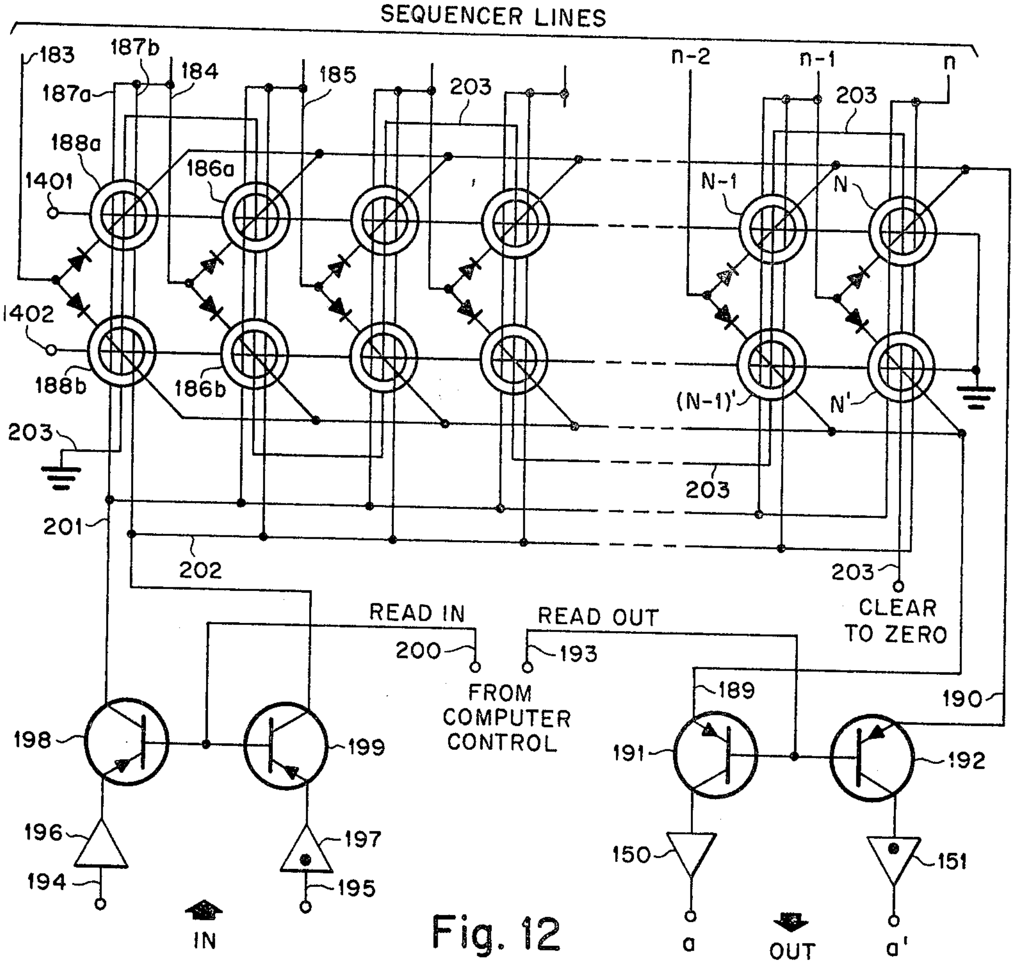

FIG. 12 is a schematic diagram of an arithmetic register constructed in accordance with the present invention.

Figure 13:
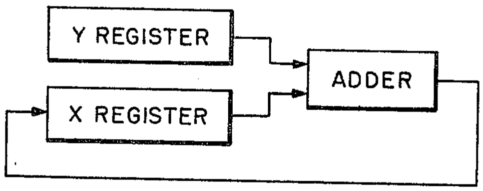
Figure 14:
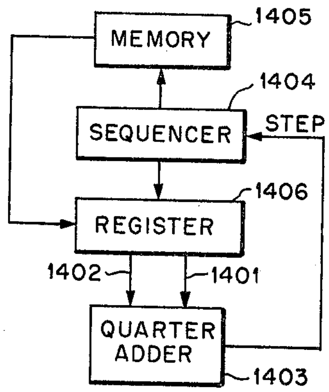

FIG. 13 is a block diagram illustrating the functional operation of the circuit shown in FIG. 12; and FIG. 14 is a block diagram of a register and associated circuitry constructed in accordance with the present invention.

As mentioned previously, the present invention is particularly concerned with effecting asynchronous operation of logical components and of computer circuits in general. An asynchronous operation, as also mentioned, includes a test to define when an operation is finished, and upon completion of each operation, the asynchronous device moves at once to the next operation. When a pair of registers are involved in the logical operation, an order or instruction, operating, for example, through a decoding function table, operates on one register and on a transfer link gate to effect transfer of the contents of the one register to the second register; and in an asynchronous device, the second register signals when the contents of the first register are received, whereby this signal ordinarily operates on the control circuits to cause transfer to the next order. Accordingly, the transfer to the next order takes place immediately upon completion of the preceding order, with the result that the time required for the program step becomes determined not by a clocked interval but by the actual time it takes to do the job, e.g., the transfer of information from one to another register.

In the case of a transfer operation of the type thus described, the transfer order itself can be made up of a number of steps. Reference is made to FIG. 1 which illustrates this concept of an asynchronous bit-by-bit operation. In particular, a pair of registers, designated register A and register B can be provided; these registers could be flip-flop registers wherein register A could comprise for example a series of six flip-flops 1 through 6, inclusive; while register B could comprise a series of seven flip-flops 7 through 13, inclusive. In such a register arrangement, a transfer operation can take place serially and bit-by-bit, whereby the transfer operation comprises a serial string of binary transfers. The completion of each transfer should, in accordance with the present invention, set in motion the next transfer operation, whereby the overall sequence is self-propagated and asynchronous in nature. This operation becomes readily apparent from an examination of the actual diagram shown in FIG. 1.

In particular, let us assume that register A contains all binary ones while register B contains all binary zeroes. A function table signal, operating on an "Execute" line 15, opens a transfer "and" gate 16. The signal on the line 15 also operates through a pulse former 17 to pass a single pulse to an input buffer 18. The output of the buffer 18 reads into the flip-flop 7 in the register B on a line 19. It also operates through a small delay means 20 to pulse a shift line 21 associated with the register B, as well as to pulse a shift line 22 associated with the register A.

As a result of the occurrence of an "Execute" pulse on the line 15, the flip-flop 7 (which had previously contained a binary zero) is caused to store a binary one, whereupon, after a short delay imposed by the delay means 20, the stored pulse representing a "one" in the stage 7 is shifted to the stage 8. The pulse occurring on the line 22 also reads the binary one out of flip-flop 1 in register A, whereupon this binary one is coupled via the open transfer gate 16 and buffer 18 into the flip-flop stage 7 of the register B.

The binary one, read out of register A, is also coupled via the delay means 20 to shift lines 21 and 22, thereby to set into motion a further shift of both registers, with a resulting transfer of further information from register A to register B. It is noted that this further shift results from the preceding shift, whereby the overall transfer of information from register A to register B is self-propagated. As long as binary ones are transferred into the flip-flop 1 of register A, the sequential transfers continue; these sequential transfers ultimately result in the shift of the pulse originally inserted into flip-flop 7 (as a result of the "execute" pulse on the line 15) from said flip-flop 7 into the flip-flop 13. When a pulse appears in the flip-flop 13, it operates as a sentinel to produce a signal on a line 23, indicating that all of the information has been transferred from register A into register B. The use of such a sentinel is optional.

From a broad operational point of view, the system described in FIG. 1 is entirely asynchronous in operation in that each transfer is effected upon completion of a preceding transfer; the time at which each transfer is initiated is determined solely by the time required by a preceding transfer operation. The transfer of each pulse from register A into register B also effects the shift operation which is necessary to transfer the next pulse from register A into register B.

The system of FIG. 1 operates in single-line logic and the propagated transfer, while on a bit-by-bit basis, works only if something is transferred on each step. The initial assumption was that register A contained all binary ones (in a return-to-zero notation); but it is appreciated that in practice this does not always occur, since binary zeros might well comprise some or all of the digits in register A. If a binary zero were to be transferred into the flip-flop stage 1, such a zinary zero, although a valid signal, could not initiate the next transfer inasmuch as the system of FIG. 1 is not capable of differentiating between a binary zero and "nothing." A system of notation is accordingly desired which differentiates clearly between zero and "nothing" (or "cleared") so that a logical component, such as the transfer network shown in FIG. 1, can determine that a valid signal comprising a binary zero is present in order that this valid signal can also initiate operation of a next step in the logical sequence.

In order to differentiate between a binary zero and nothing, with binary zero being a valid information signal, a system of notation of the type shown in FIG. 4A may be advantageously employed. In particular, a double-line arrangement is preferably employed wherein "nothing" or cleared is defined as state 0–0 on two lines. A binary one is defined as state 1–0 on two lines; a binary zero is defined as 0–1 on two lines; and the two-line state 1–1 is excluded as an invalid information signal. When such a system of notation is employed, each register position comprises a pair of storage stages, e.g. a pair of flip-flops, whereby a register position, which has either a 1–0 or 0–1 stored at that position, may be said to have valid information stored therein; while the presence of 0–0 at a register position indicates that the register is cleared at that position; and the storage of 1–1 at that register position indicates that invalid information which is to be excluded has somehow erroneously found its way into the register position.

An overall system, generally analogous to that shown in FIG. 1, but operating on such a double-line logic, is illustrated in FIG. 2. The registers A and B of FIG. 1 are replaced by a pair of registers A′ and B′, each register containing a pair of flip-flops for each stage, respectively. Each stage of register A′ and register B′ thus has four stable states, i.e. 0–0, 1–0, 0–1 and 1–1, with these relative states being predefined according to the definitions already given (see FIG. 4A).

Let it be initially assumed that register B′ is completely cleared, whereby every positional stage in that register has the relative state 0–0 in the two-flip-flops comprising that stage. A pulse signifying that a transfer operation is to commence arrives on "Execute" line 24 and is coupled via an input buffer 25 to the shift line 26 of a control shift register 27. Assuming that the control shift register 27 has a sentinel or control pulse stored in the position $n+1$ thereof, the arrival of the initial shift pulse on the line 26 causes this control pulse to be shifted from the stage $n+1$ of the control register 27 via a line 28 to the register position 1 of the shift register 27. The arrival of this control pulse in the stage 1 of the register 27 opens an input "and" gate to each flip-flop, respectively, in the first stage of the register B′. These input gates have been designated $G_1$ (in the plurality of input gates 29 associated with the lower flip-flops of register B′); and $G_2$ (in the plurality of input gates 30 associated with the upper flip-flops of register B′).

The arrival of the control pulse in the stage 1 of the control shift register 27 also couples a signal via a line 31 to clear the first pair of flip-flops in the register A′ to 0–0. This clearing operation produces an output pulse from the register A′ either on a line $\alpha$ or a line $\beta$, depending upon where the pulse (i.e. the "1" of 1–0 or 0–1) was stored; this output pulse, appearing on either line $\alpha$ or line $\beta$, thereupon passes via one of the open gates $G_1$ or $G_2$ to the corresponding flip-flop in the corresponding stage of the register B′. Inasmuch as all of the flip-flop stages of register B′ had initially been cleared, the transfer of a pulse into one of the flip-flops in the register B′ causes a transition of that flip-flop, with a resultant output signal on one or the other of $\alpha'$ or $\beta'$ lines at the output of register B′.

In summary, valid information in the register A′ takes the form of either 0–1 or 1–0; this valid information is transferred as a pulse on a single one of the lines $\alpha$ or $\beta$, and causes a transition of one of the flip-flops in a corresponding stage in the register B′, thereby storing the valid 1–0 or 0-1 in the corresponding stage of the register B′, with the resultant production of a signal on one of the output lines $\alpha'$ or $\beta'$.

The two lines $\alpha'$ and $\beta'$ are coupled to a quarter adder 32 (an exclusive "or" circuit), and act as input lines thereto. When a valid transfer has occurred, the two inputs to the quarter added contain a "1" and a "0," whereby the quarter adder produces an output pulse on its S output line 33. This output pulse, which occurs on the line 33 as a result of a valid transfer of information into the register B′, is coupled through the buffer 25 to the shift line 26 to inaugurate the next transfer. The control pulse which had originally been in the stage 1 of the register 27 is accordingly now shifted to the stage 2 of the register 27 whereby the next set of input gates $G_1$ and $G_2$ to the register B′ are opened; the next transfer of information occurs from the register A′ to the register B′, etc.

It will be appreciated from the foregoing discussion that a self-propagated transfer sequence occurs so long as valid information is present in the register A′. Regardless of whether the information in each of the several stages of the register A′ is binary zero or binary one (as predefined), each such piece of valid information includes a 1 therein whereby a pulse always occurs, after a bit (*bi*nary digi*t*) of valid information has been transferred, to initiate the transfer of the next bit of information.

If, for some reason, no pulse transfer takes place (a condition called "drop-out") wherefore the signals appearing on the lines $\alpha$ and $\beta$ would also be 0–0, then the register B′ output on the lines $\alpha'$ and $\beta'$ would also be 0–0. The quarter adder 32, for this 0–0 input condition, produces no output on its S output line 33 and the transfer operation halts. Similarly, if for some reason a 1–1 (corresponding to a "pickup") appears on the lines $\alpha$ and $\beta$, or occurs in a given stage of the register B′, then 1–1 signals would also appear on the $\alpha'$ and $\beta'$ lines, whereby, once more, the quarter adder 32 produces no output on its line 33, and again the transfer operation halts.

A flip-flop circuit 34, a delay element 36, a coincidence or "and" gate 37, and a resettable one-shot multivibrator 38 are used to detect the halting of a transfer. The multivibrator 38 remains in its active state (providing no output signal) so long as input signals from the shift line 26 are applied thereto. Specifically, the one-shot multivibrator 38 is normally set by each shift pulse occurring on the S output line 33 so that following the receipt of the execute pulse, and the subsequent quarter adder pulses which result from valid transfers, the multivibrator 38 removes the conditioning signal on the gate 37. In other words, the multivibrator 38 when it is in its inactive state conditions the gate 37. The flip-flop 34 puts the other conditioning signal on the gate 37 via the delay 36 following the receipt of the "execute" pulse on the line 24. The delay 36 prevents the flip-flop 34 signal from reaching the gate 37 until after the first transfer has been effected. In the event that a pulse should not appear on the line 33, indicating either a drop-out or pickup of information during the transfer, the multivibrator 38 relaxes to its inactive state, whereby the gate 37 opens and an error signal appears at the error output terminal 40.

Summarizing the operation of the circuit shown in FIG. 2 therefore, it is noted that the control signal pulse which initially appeared in the stage $n+1$, in response to occurrence of an execute signal on the line 24, is cleared from the stage $n+1$ and transferred into the stage 1 of register 27. This transfer of the control pulse into the stage 1 of the register 27 initiates the transfer of information from the register A′ to the register B′; and, so long as the information transferred is valid information, the transfer continues on a bit-by-bit basis and is self-propagated in nature. During the transfer operation, the control or sentinel pulse in the register 27 is shifted through successive stages corresponding to the successive transfers of information from the register A′ to the register B′, until the said control pulse returns to the final stage $n+1$ of the register 27. Upon transfer of the control pulse into the stage $n+1$, a complete signal appears on the output line 41 and this signal is also coupled to the flip-flop 34, resetting this flip-flop and thereby blocking the gate 37 until the receipt of the next execute pulse.

In the event that an improper transfer of information should occur at any time, due to either a pickup or dropout of a pulse, this invalid transfer results in the occurrence of a signal on the error line 40. The overall system thus has the interesting property that the transfer of information is completely checked bit-by-bit as the transfer occurs. Transmission errors are caught at the instant of commission, and the erroneous bit is defined. Automatic self-correction thus becomes relatively easy; and in particular, a parity bit could be included in each word of information stored in the register A′, for example, whereby one could readily determine whether the error was a dropout or a pickup. The concept of employing parity bits for checking purposes is, of course, well known, and such a parity bit, like other bits in the word stored in the register A′, would comprise a pair of bits, e.g. a 1–0 or a 0–1. Through use of such a parity bit, enough information is provided to reconstruct the original data, provided only one error is committed. The error output occurring on the line 40 can therefore be employed to set a flip-flop which is operative to transfer the information conditionally to an error program, so long as no further errors in the word transfer occur; and the error program can be conditioned to stop the transfer upon occurence of a second error.

In addition to being self-checking in nature, the system is moreover completely asynchronous in nature. From a bit-by-bit point of view, each bit of information is transferred only upon completion of a valid transfer of a prior bit; and this prior valid transfer produces a signal to initiate a next subsequent transfer. Moreover, from a system point of view, the arrangement of FIG. 2 is also completely asynchronous in nature, in that occurrence of an execute signal on the line 24 is followed by a complete signal on the line 41, only after all of the information in the register A′ has been completely transferred to the register B′; and the signal thus appearing on the line 41 can be employed to initiate a next program step. The time of occurrence of a signal on the line 41 is not controlled by any clock sources or by any present or limited time scale employed; and, to the contrary, is governed solely by the time required to transfer completely the information from the register A′ into the register B′.

The discussion given with respect to FIG. 2 illustrates certain general principles of asynchronous operation in accordance with the present invention; and larger asynchronous machines utilizing plural logical circuits can be employed, with each of these circuits being so associated with the remaining circuits that the operation of each circuit is initiated upon proper completion of a prior program step. Each step of the program, moreover, includes a test procedure to determine when that step has been completed, and produces a control signal operative to initiate the next logical program step. These concepts of asynchronous operation as applied to larger machines will be discussed subsequently. However, before proceeding to such larger asynchronous systems, it is desirable to consider in some detail the circuits and methods applicable to relative simple networks of the types already described.

As has already been mentioned, the first requirement of any circuit configuration adapted for asynchronous operation is that it be spike-free. The logical elements should not produce spurious signals during their transitions between permitted operating states for, inasmuch as no clocking is provided, such spurious signals or spikes would be incorrectly interpreted by the overall machine and would result in errors. In general, any symmetrical function is spike-free. For example, conventional gates and buffers are spike-free, and networks composed of these elements do not generate spikes. This particular generalization is true for return-to-zero signals, but is not true for all networks using non-return-to-zero notation; and as a result, the notation employed in asynchronous circuits of the types contemplated by the present invention should preferably be of the return-to-zero type, i.e. the signals should be transmitted as pulses and not as pulse envelopes.

One can usually determine by inspection of the truth table for a logical function whether or not that function is spike-free. FIGS. 3A through 3D, inclusive, depict the truth tables for various commonly utilized logical functions. In particular, FIG. 3A illustrates the truth table for a gate; FIG. 3B, the truth table for a buffer; FIG. 3C, the truth table for a majority organ; and FIG. 3D, the truth table for an exclusive-OR circuit, or a quarter adder. From inspection of all of these truth tables, it will be seen that all are spike-free except for the exclusive-OR circuit or quarter adder depicted by the truth table of FIG. 3D. In any logical circuit corresponding to the truth tables of FIGS. 3A, 3B or 3C, input pulses either produce the proper output signal; or produce a zero output during transition between desired operating states. No possible transition of signals can occur in any of the arrangements corresponding to the truth tables of FIGS. 3A through 3C, inclusive, wherein a spike pulse may occur during a transition.

The truth table of FIG. 3D, corresponding to the operation of an exclusive-OR circuit, is capable of producing spikes. By way of example, it should be noted that when the inputs $a$ and $b$ are respectively 1 and 1, the output of the device should be 0. Similarly, the output of the device should be 0 when the inputs $a$ and $b$ are, respectively, 0 and 0. A transition from 0–0 input state to the 1–1 input state should have no effect upon the output, and that output should remain at 0. Misalignment of the $a$ and $b$ input pulses, however, can cause transient input conditions to occur wherein the $a$ and $b$ inputs are either 0–1 or 1–0, with the results that an undesired spike would occur at the output during the transition. This possibility of spike outputs, characteristic of the truth table of FIG. 3D, actually results from the operation of negation; and it may be generally stated that in single-line logical systems of types suggested heretofore, any operation of negation is accompanied by the possibility of spike outputs.

Logical networks are, of course, frequently constructed of single-level buffer inverter elements. These networks depend upon the fact that a buffer for positive signals is a gate for zero or negative signals. It is normal practice for the buffers and gates to occur in alternating layers, with the output of a buffer feeding the input of a gate, the output of that gate feeding the input of a next subsequent buffer, etc. Since such buffers and gates do occur in alternating layers, it follows that a buffer inverter (e.g. a diode cluster followed by a complementing amplifier), satisfies the requirement of spike-free operation already discussed; and the elements are spike-free when they act as pure gates or buffers. Inhibition or negation in such systems is, however, normally accomplished by mixing both signals and complements on the input of an amplifier; and when this is done, spikes can occur.

As has already been discussed, the present invention employs a double-line logic in order to eliminate spikes and to simultaneously eliminate the necessity for clocked operation. In order that these concepts may be more fully appreciated, consider the two-line notation discussed previously with respect to FIG. 2 so that the rules for spike-free operation can be derived. It is recalled that information was transferred between the registers A′ and B′ in the arrangement of FIG. 2 in a two-line form, with the actual nature of each information bit being determined by the relative potential states on the two lines. These relative potential states are predefined in accordance with the table of FIG. 4A, whereby the relative potential states are capable of distinguishing between a binary zero, a binary one, a "nothing" or cleared state, and an excluded information state.

If one were to construct the two-line equivalent of a conventional single-level buffer complementer, it should have the behavior shown in the truth table of FIG. 4B. The individual signals on the two inputs are, as indicated in FIG. 4B, each characterized by relative potential states on two lines, and the output of the system is also characterized by the relative states on two output lines. The truth table of FIG. 4B can be summarized as follows: The combination of "nothing" and "nothing," or of binary zero and nothing at the input of the device, always yields nothing at the output of the device. A binary one input on any pair of lines will always produce a zero output, regardless of the signal states on the other lines at the input of the device, i.e. a 1–0 at any input of the device always produces a 0–1 at the output of the device, regardless of whether the other input to the device is 0–0, 0–1 or 1–0. Finally, the combination of zero and zero always yields a one.

Stated functionally, the device characterized by the truth table of FIG. 4B should be a buffer for ones, a gate for zeros, and should complement signals or single inputs, turning zero to one and one to zero. An input of nothing in the absence of a "one" input, however, should always give an output of nothing.

In considering a truth table, it must be appreciated that all possible transitions exit. Unless logical constraints are provided, it is possible to move from any input condition to any other input condition. In the logic discussed here, a constraint is imposed that an input of "nothing" must exist between each information input, e.g.; the system operates in "return to nothing" notation. With this constraint, it can be seen that partial invalid outputs are not generated in the truth table of FIG. 4B. A further constraint is that there must be time overlap between cooperating information inputs (there must be a period during which they exist concurrently) and further that there must be an overlap of "nothing" inputs in the intervening periods.

With these rules of double-line logic developed in the truth table of FIG. 4B, one can now reconstruct the double-line truth table of FIG. 4B to develop the truth table for the troublesome NOT gate already discussed. Such a further truth table is shown in FIG. 4C, wherein the inhibition or negation function is illustrated by the use of the complement input $\overline{\overline{B}}$. Examination of FIG. 4C reveals that it is identical to that of FIG. 4B, i.e. the NOT gate of FIG. 4C is identical to that of a conventional gate-buffer. However, through the use of the double-line notation, a mechanism has been provided which reflects the difference between binary zero and "nothing."

The systems of FIGS. 4B and 4C (which are the same for all practical purposes), can actually be characterized as "return-to-nothing" systefs, as distinguished from the return-to-zero systems of conventional single-line logic. No spikes can possibly exist in the truth table of FIG. 4B or of FIG. 4C. Until the necessary and sufficient information is present at the inputs of the systems, the output will be nothing; and any transition either produces a proper output or produces "nothing." Due to this characteristic of the system, i.e. the return-to-nothing characteristic, no spikes can possibly occur; and the outputs of the device is nothing or 0–0 until a valid signal of 1–0 or 0–1 is produced.

When such a return-to-nothing double-line logical system is employed for binary addition, the truth table of such a double-line logical binary adder takes the form shown in FIG. 5A. This truth table of FIG. 5A may be compared with the truth table of FIG. 5B which corresponds to the truth table of a conventional single-line adder. The first line of the FIG. 5A truth table, comprising a string of 0's, represents the input and output notation for "nothing" or no-inputs, as distinguished from binary zero shown in the second line of the FIG. 5A truth table. There is no corresponding notation for "nothing" in the one line system of FIG. 5B.

It will be appreciated, of course, that a double-line logical network is required to utilize and interpret the double-line notation discussed in reference to FIGS. 4A through 4C and FIG. 5A. Such a logical element is shown in FIG. 6A; and the element comprises a pair of complementing amplifiers 45 and 46, each of which has a pair of inputs and a single output. The inputs to the logical element are in the two-line notation already discussed. In particular, one input, corresponding to either a binary zero, a binary one, or nothing, occurs on a pair of lines 47–48; while the other input similarly occurs on a pair of lines 49–50.

To simplify the discussion of FIG. 6A as well as the subsequent discussion of logical networks employing the two-line notation of the present invention, the pair of input lines utilized to designate each bit of information are given corresponding letter designations, with one said line (disposed to the right of the other line) always being given a primed notation. Thus, the two inputs to the FIG. 6A logical element are designated respectively *a—a'* and *b—b'*, while the output of the logical element appears on a pair of lines *c—c'*. The complementer 45 derives its inputs from lines *a'* and *b'* buffed together; and said complementer 45 produces the *c* output of the element. Similarly, the complementer 46 receives its inputs from the *a—b* lines buffed together; and produces the *c'* output.

The actual signals appearing on lines *a—a'* and *b—b'* preferably take the form shown in FIG. 6B. Thus, the signals utilized on the lines *a* and *b* for a binary "1" and received on line *c'* are positive-going signals from a given base level. The signals used on the lines *a'* and *b'* for a binary "0" and received on *c* are negative-going from a given base level. Stated differently, if the A signal input is a binary one, the signal state on the two input lines *a—a'* is such that the *a* line has a positive-going pulse from a low level base line, while the *a'* line remains at a steady state high level. The relative potentials on the A lines for such a binary one state may, therefore, be said to comprise a "high-high" potential state on the *a* and *a'* lines respectively. Similarly, a binary zero is represented by a steady state low level potential on the *a* line and by a negative-going signal from a high level base line on the *a'* line, wherefore the relative potential states on the two lines for such a binary zero may be said to comprise a "low-low" potential state on the *a* and *a'* lines respectively. The "nothing" state is represented, as depicted in FIG. 6B, by a low potential on the *a* line and by a high potential on the *a'* line, whereby the nothing state can be said to comprise a "low-high" relative potential state on the *a* and *a'* lines respectively. Similarly, the excluded or 1–1 condition in the two-line notation would be represented by a "high-low" potential state on the *a* and *a'* respectively. Similar potential levels prevail on the B and C lines for similar conditions.

Recognizing these possible relative potential states on the A, B and C lines of FIG. 6A for the various binary one, zero, and nothing inputs and outputs, it will be seen that the logical network of FIG. 6A operates in full accord with the truth tables of FIGS. 4B and 4C. By way of example, and taking the first line of the FIG. 4B truth table, it will be noted that when the A and B inputs to the FIG. 6A network are each nothing, the *a* and *b* lines each have a low potential thereon; while the *a'* and *b'* lines each have a high potential thereon. The two buffed inputs (lines 48 and 50) to this complementer 45, therefore are each at a high potential whereby the output *c* of the complementer 45 is at a low potential state. The two buffed inputs to the complementer 46 are both at a low potential state whereby the output *c'* of the complementer 46 is at a high potential state. The two lines *c—c'* therefore have output potentials which are respectively low-high in nature which, by definition, is a nothing output. In short, the first case of the truth table is satisfied in that two nothing inputs produce a nothing output.

If a binary one input should appear at the input to the device, the output of the device will always be binary zero. Merely by way of example, let us assume that a binary one input appears on the lines *a—a'*, whereby each of these lines is at a high potential (i.e. the potential state for a binary one input is high-high). Inasmuch as each of the lines 47 and 48 is at a high potential, one input to each of the complementers 45 and 46 is similarly at a high potential, whereby the outputs of the complementers 45 and 46 (lines *c* and *c'* respectively), must each be at a low potential regardless of the relative potentials on the lines *b* and *b'*. In short, a binary one input at any input to the device always produces a binary zero output from the device, regardless of the potential states or signal inputs at the other inputs to the device. This situation corresponds to the third, fourth, sixth, eighth and ninth cases of the FIG. 4B truth table, whereby each of these further cases is satisfied.

The second and fifth cases of the FIG. 4B truth table depict that situation wherein the A and B inputs comprise a combination of binary zero and nothing. For this combination input, one set of the *a—a'* or *b—b'* lines is low-low in potential state while the other set is low-high in potential state. For these relative potential states, one input to complementer 45 is high, while both inputs to complementer 46 is low in potential state, whereby the *c—c'* output lines are respectively low-high in potential state. In short, the combination of a binary zero and nothing at the input of the device always produces nothing at the output of the device, whereby cases two and five of the FIG. 4B truth table are also satisfied.

Finally, case seven of the FIG. 4B truth table corresponds to that situation wherein the two inputs A and B are each binary zero. For this input condition, all of the lines 47 through 50 and all of the inputs to the complementers 45 and 46 are at a low potential state, whereby the outputs *c—c'* of the two complementers are at a high potential state; and this high-high potential state on the lines *c—c'* corresponds, of course, to a binary one, wherefore case seven of the FIG. 4B truth table is also satisfied.

As has been demonstrated by the foregoing discussion, therefore, the logical circuit of FIG. 6A operates in strict accordance with the truth table of FIG. 4B (and of FIG. 4C) in response to input signals of the types shown in FIG. 6B. The element of FIG. 6A is a buffer for signals, a gate for complements, and an inverter for single inputs, wherefore it satisfies all of the rules set forth previously. Moreover, in the operation of the circuit shown in FIG. 6A, a clear distinction between binary zero and nothing is constantly maintained; and the resultant return-to-nothing operation which characterizes transitions between all possible signal input states on the inputs of the device, assures that the device is completely spike-free in operation.

The logical circuit of FIG. 6A in fact comprises the preferred basic logical component for an asynchronous machine constructed in accordance with the present invention; and all of the logical networks, to be discussed hereinafter, are constructed of interconnected units taking the form shown in FIG. 6A. Indeed, as will become apparent from the subsequent discussion, any known single-line logical circuit can be converted into the double-line logic employed in the present invention through the use of elements of the types shown in FIG. 6A; and the resultant circuit operates spike-free in a double-line logical notation, wherefore such a resultant network can be utilized in an asychronous machine in accordance with the present invention.

The complementing amplifiers 45 and 46 can be of any convenient form, and one possible circuit for these complementing amplifiers are shown in FIGS. 7A and 7B, respectively. It will be appreciated, of course, that the FIGS. 7A and 7B circuits actually show only one-half of the overall FIG. 6A logical network; and when a circuit of either of the types shown in FIGS. 7A and 7B is to be employed in accordance with the preceding discussion, a pair of such circuits would be interconnected between the pairs of input and output lines, in the manner already described in reference to FIG. 6A.

The FIG. 7A circuit comprises a transistor 51 arranged in a grounded emitter connection. The base of the transistor 51 is coupled to a voltage divider step-down circuit comprising resistors 52 and 53, having one end thereof connected to a positive potential source; and said base is also coupled via a speed-up capacitor 54, as well as by the aforementioned step-down circuit, to a buffer input comprising diodes 55 and 56, the cathodes of which are connected to a minus V potential through a resistor 57. The input diodes 55 and 56 may be conventional or, if it is desired to increase the speed of operation of the overall circuit, the input diodes may comprise Zener diodes by appropriate changes in the several potential sources associated with the overall circuit. The collector of the transistor 51 is coupled via a resistor 58 to a source of negative potential.

The system shown in FIG. 7A responds to a coincidence of negative-going signals at the diodes 55 and 56 to produce a positive-going output signal on the output line 59. In practice, when the circuit of FIG. 7A is to be employed in a logical arrangement of the type shown in FIG. 6A, the FIG. 7A circuit is utilized as either complementer 45 or complementer 46. If utilized as complementer 45, two of the input diodes such as 55 and 56 are connected respectively to the lines 48 and 50, while the output line 59 would be connected to line *c*. A similar connection would be effected between the input buffers and output line in the complementer portion comprising the complementer 46. Inputs in excess of two could occur under many circumstances; and as many inputs as are desired could be provided for each complementer merely by providing such input diodes buffed to one another.

Inasmuch as the circuits described previously and utilized in the present invention operate in a return-to-nothing notation (return-to-zero for a particular complementing amplifier), either A.C. or D.C. coupled circuits can be employed. As described, the circuit of FIG. 7A acts as a buffer-complementer for high level signal inputs and as a gate complementer for low level signals. That is, the presence of a substantially zero potential level input on any one of the input diodes produces a negative potential level output whereas the appearance of simultaneous low (or negative) level signals on all the input diodes produces a high or zero potential level output. This circuit will be hereinafter referred to as a complementer or an inverter and will be represented in the subsequent block diagrams as a triangle with a dot at its base. A non-inverting or non-complementing amplifier will be shown as a triangle without the dot at its base. Such a non-inverting or non-complementing amplifier is typically illustrated in FIG. 7B. In one form, this circuit could be a transistor emitter follower circuit wherein a negative level input signal cuts off the input diode **55*a* permitting the base potential of the transistor 51*a* to go negative by the action of the base divider circuit 53*a*, 52*a* and 57*a*. When this occurs, the transistor 51*a* conducts and the emitter current produces a drop across the resistor 58*a* and thus a negative potential output. A zero potential level input holds the potential at the junction of the resistors 52*a* and 57*a* at zero, so that the potential at the base electrode can go positive by means of the base connection through the resistor 53*a*** to a +V potential. When this occurs, the transistor is blocked and no emitter current flows, causing the output to rise in potential to zero.

Referring to FIG. 8, there is shown a block diagram of a system for asynchronously performing serial addition, in accordance with this invention. An adder 800 is provided for serially adding two input signals A and B to provide a sum S. In accordance with the present invention, the input signal A is applied in a pair of lines *a—a'*, and that of the input signal B is applied on a pair of lines *b—b'*. The output sum S appears on a pair of lines *s—s'*. As described above, a "nothing" is represented on a pair of lines as a "low-high" or 0–0; a binary "one" as a "high-high" or 1–0; a binary "zero" as a "low-low" or 0–1; and an excluded (error) signal as a "high-low" or 1–1.

The adder 800 has its sum output *s—s'* coupled to an output register 802, or other suitable output means, which receives the totaled sum for subsequent purposes which may be desired. The output sum *s—s'* is coupled to an error detector 804 which provides an error signal in the event the sum output is an excluded signal of "high-low" or 1–1.

The sum output *s—s'* of the adder 800 is further coupled to a quarter adder 806, which operates as an "excluded-or" circuit. The quarter adder 806 provides an output pulse whenever the sum S is not an information signal of one or zero. The output of the quarter adder 806, therefore, is a sprocket pulse which designates that no information appears on the sum output lines. In other words, the presence of a sprocket pulse indicates that the adder 800 is prepared for a pair of subsequent digits at its *a—a'* and *b—b'* input terminals.

The A and B digits are provided, respectively, from an A register and a B register which is controlled by a sequencer 808, as shown in FIG. 9. The sprocket pulse is coupled to the sequencer 808 to cause the A and B register to provide outputs therefrom as described more fully hereinafter.

As will be appreciated from the foregoing discussion, a word sequencer 808 is provided for cooperation with the sprocket pulses to send pairs of add inputs to the adder 800 when, and only when, a valid addition of a preceding pair of add inputs has been completed. Such a sequencer is shown in FIG. 9; and as will become apparent from the subsequent description, this sequencer is operative to send add inputs to the adder of FIG. 8 every time the adder signals the sequencer that a previous addition has been validly completed.

The particular sequencer shown in FIG. 9 is constructed on the assumption that the word to be added comprises a total of eight bits, wherefore the sequencer is operative to produce nine sequential pulses, with the first eight of these pulses being utilized to feed bits in succession to the adder of FIG. 8; and with the ninth pulse being operative to signify that a complete word addition has been completed. It will be appreciated, of course, that by expansion of the principles to be described in reference to FIG. 9, the sequencer can operate to sequence words having more or less than eight bits.

In the example shown in FIG. 9, the word sequencer comprises two ring counters, each of which is adapted to step through three positions; and the two ring counters are interconnected to one another whereby a complete stepping cycle of one ring counter causes a single step in the second ring counter, with the result that the two ring counters operate on a scale of nine. The first of the two ring counters comprises three complementers 118 through 120, while the second ring counter comprises three complementers 121 through 123. Inasmuch as these two ring counters are analogous in structure and operation, the first only of the said counters will be described in detail, with the understanding that the second counter operates in a similar manner.

In particular, the ring counter comprising complementers 118 through 120 is so constructed that the output of the complementer 118 is coupled via a line 124 to an input of the complementer 119, and via a delay means 127 to an input of the complementer 120. The output of the complementer 119 is coupled via a line 125 to an input of the complementer 120 and via a delay means 128 to an input of the complementer 118. The output of the complementer 120 is coupled via line 126 to an input of the complementer 118, and via a delay means 129 to an input of the complementer 119. The three complementers 118, 119 and 120 are accordingly interconnected in a closed ring, head-to-tail; and the several delay means 127 through 129 are provided, as will become apparent from the subsequent description, to assure that the ring can step in only one direction in response to stepping pulses.

In order to appreciate the operation of the ring counter 118 through 120, assume that the output of the complementer 118 is high in potential. The line 124 accordingly has a high potential signal thereon whereby at least one input to both of complementers 119 and 120 is at a high potential; and the outputs of both of complementers 119 and 120 must therefore be low in potential. For this first assumed state, therefore, only the complementer 118 is producing a high-level signal output. If now a high-level stepping pulse should appear on line 130, due either to the occurrence of a sprocket pulse on line 114 from the quarter adder 806 (FIG. 8) or due to the depression of a start button 131 adapted to initiate the overall sequencing operation, this first pulse on the line 130 is then coupled, as shown, to one input of each of the complementers 118, 119 and 120. Inasmuch as the complementers 119 and 120 are already in a low output producing state, the step pulse has no effect upon their operation. The input pulse appearing on the line 130, however, causes the complementer 118 to switch to a low output producing state, wherefore the line 124 assumes a low potential. Inasmuch as the lines 125 and 126 are already at low potentials, the switching of the complementer 118 will produce low potentials at the inputs of the complementer 119, wherefore the complementer 119 switches to a high potential output producing condition. The switching of the complementer 118 has no effect upon the output state of the complementer 120, however, due to the inclusion of delay means 127; which provides a delay slightly exceeding the direction of the pulse on the line 130 and accordingly, only the complementer 119 switches to a high output producing condition, whereafter the high potential appearing on the line 125 assures that both of complementers 120 and 118 remain in a low output producing state.

A second pulse appearing on the line 130, signifying that a binary addition has been completed in the adder of FIG. 8, causes a similar sequence of operations to occur. In particular, such a second input pulse switches the complementer 119 to a low output producing state, whereupon the complementer 120 switches to a high output producing state; and the switching of the complementer 119 to its said low output producing state has no effect upon the complementer 118, due to the inclusion of the delay means 128. A third pulse on the line 130 switches the complementer 120 to a low output producing state, while the complementer 118 is switched back to its high output producing state. As will be appreciated from this description, therefore, the ring counter 118–119–120 is caused to step upon occurrence of each pulse on the line 130; and the counter describes a complete revolution in response to the application of three pulses thereto.

The outputs of the complementers 118, 119 and 120 are coupled via driving and inverting amplifiers 231, 232 and 233 to three lines 134, 135 and 136 in a group of nine lines, designated 143. The line 136 is coupled via a further inverting and driving amplifier 137 to the input of the second ring counter comprising complementers 121 through 123. The output of amplifier 137 thus performs a function directly analogous to that of line 130, in that the second ring counter comprising amplifiers 121 through 123 is caused to step, in the manner already described, upon occurrence of each pulse at the output of the amplifier 137. The second ring counter 121 through 123 thus makes one step for every revolution of the first ring counter, whereby the two ring counters taken together count to modulo nine. The outputs of the amplifiers 121 through 123 are also coupled via inverting and drive amplifiers analogous to amplifiers 231 through 233 to three further lines in the line group 143 as illustrated.

The input of the sequencer includes a flip-flop comprising a pair of complementers 138 and 139 connected head-to-tail, as shown. The inputs to the complementer 138 are derived from the output of the complementer 139 as well as from the start sprocket line 114 (or start button 131). The input to the complementer 139 are derived from the end pulse line 155 and from the output of complementer 138. When either complementer is in a high potential output producing condition, the other amplifier must be in a low potential output producing condition; and the actual relative output complements of the two complementers 138 and 139 are controlled by the signals which appear on the lines 114 and 155. The output of the control flip-flop 138–139 controls complementers 140, 141 and 142. When complementer 139 of said control flip-flop is in a high potential output producing condition, all of complementers 140 through 142 are necessarily in a low potential output producing condition; while conversely, when complementer 139 is in a low potential output producing condition, all of complementers 140 through 142 are in a high potential output producing condition. The outputs of the three complementers 140 through 142 are coupled to three further lines in the line group 143, as illustrated.

The total of nine lines, designated 143, thus comprises the three outputs of the inverter 140 through 142, and the six outputs of the two ring counters 118 through 120 and 121 through 123. These nine lines 143 are coupled in groups of three to a total of nine complementing amplifiers 144*a* through 144*i* inclusive. Eight of these amplifiers 144*a* through 144*h* inclusive have their outputs coupled respectively to eight drive lines 145*a* through 145*h* associated with a pair of operand registers 146 and 147.

The particular operand registers 146 and 147 shown in FIG. 9 are of the toggle switch type, and each register comprises a plurality of single-pole, double-throw switches movable between two positions, with the particular position chosen for each switch designating the particular bit stored at a particular position in a given register. Merely by way of example, it will be noted that drive line 145*a* is coupled to a switch 148 in the register 146 which, in the particular illustration of FIG. 9, is coupled to an *a'* output line. Similarly, the drive line 145*a* is coupled to a further switch 149 which is connected to the *b* output line of the operand register 147. Upon occurrence of a driving pulse on the line 145*a*, therefore, an output pulse occurs on the *a'* line, whereby the register 146 produces a 0–1 output, designating a binary zero. Similarly, the occurrence of a driving pulse on the line 145*a* produces an output pulse on the *b* output line of the register 147, wherefore the register produces a 1–0 output, designating a binary one output. For the particular switch positions shown in FIG. 9, therefore, the occurrence of a first driving pulse on the line 145*a* causes the read-out of a binary zero from the operand register 146, and the read-out of a binary one from the operand register 147, with these two signals being fed to the inputs of the FIG. 8 adder for summation. A second driving pulse appearing on the line 145*b* causes two binary zeros to be read-out; a third driving pulse on the line 145*c* causes a binary one to be read-out of the register 146 and a binary zero to be read out of the register 147, etc.

In order to preserve the notation previously described, the output *a* line of register 146 is fed by a non-complementing (non-inverting) amplifier 150, while the output *a'* line of that same register is fed by a complementing (inverting) amplifier 151. That is, a high level signal applied to amplifier 150 produces a high level output while a high level input to amplifier 151 produces a low level output. Conversely a low level input to amplifier 150 produces a low level output and a low level input to amplifier 151 produces a high level output. It will be understood that in the absence of drive signals on lines 145*a* to 140*h*, the input to amplifiers 150 and 151, are assumed to be low level. This assures therefore that a binary zero output is designated by a low-low potential state on the two output lines *a–a'*, while a binary one output is signified by a high-high potential state on the two output lines. A similar situation exists at the output of operand register 147, and non-complementing amplifier 152 and complementing amplifier 153 are provided to perform functions similar to those already described for emplifiers 150 and 151.

It will be appreciated, of course, that the particular form of toggle switch register shown in FIG. 9 is illustrative only, and other forms of registers can be employed. Indeed, a magnetic register, such as may be employed in the arrangement of FIG. 9, will be described subsequently with reference to FIG. 10.

Discussing now the overall operation of the circuit shown in FIG. 9, assume that an addition is to be commenced. A first control pulse is produced by control circuits in the machine or by depression of the start button 131; and this first pulse causes the flip-flop 138–139 to be so set that complementer 139 is in its "high" output state whereby high potential inputs are applied to all of complementers 140 through 142. The outputs of all of these complementers 140 through 142 therefore will be in a low potential output producing state. For this first pulse on the line 130, each of the ring counters 118 through 120 and 121 through 123 assume one of their stable states, whereby the first driving amplifier **144*a* has all of its inputs at low potential. At least one of the inputs to all of the other amplifiers 144*b* through 144*i* is at high potential, whereby only the amplifier 144*a* produces an output. This output from amplifier 144*a* inaugurates the read-out of the first bit in each of registers 146 and 147**, whereby these first two bits are fed to the input lines *a*, *a'*, *b*, and *b'* of FIG. 8, in the manner already described; and the output from the complementer **144*a* also pulses a line 154 which is coupled to the adder 800** (FIG. 8) to assure that the initial "carry" is set to a binary zero output producing condition.

The output of the complementer **144*i* produces an ending pulse on the line 155 which sets flip-flop 138–139 in such manner that the complementer 139 has a low output potential state. The outputs of all of complementers 140 through 142 therefore assume a high potential output state; and inasmuch as the outputs of the complementers 140 through 142 are coupled to the inputs of each of amplifiers 144*a* through 144*i*, this assures that all of the amplifiers 144*a* through 144*i* have a low output producing condition, wherefore the outputs of the registers 146 and 147** return to nothing.

Summarizing the foregoing, it will be seen that initiation of the sequencing operation reads a first pair of digits out of the operand registers 146—147 and into the adder, and sets the adder carry storage to a binary zero output producing condition; whereafter the outputs of the operand registers (and the inputs to the adder) are returned to nothing. The addition then proceeds through the adder of FIG. 8; and after occurrence of a valid sum at the sum output terminals *s—s'* a start sprocket pulse appears on the line 114, indicating that the output of the adder has changed from an information digit (1–0 or 0–1) to "nothing" (0–0). This start sprocket pulse (see FIG. 9) steps the ring counter 118 through 120 to its second step, and also sets control flip-flop 138—139 to reduce the outputs of all of complementers 140 through 142 to a low output producing condition. For the second step of ring counter 118 through 120, only complementer **144*b* will have all of its inputs at low potential, whereupon the second digit is read from each of the operand registers 146 and 147 into the adder of FIG. 8. As the addition proceeds, an ending sprocket pulse appears on the line 155 which resets the sequencer control flip-flop 138—139 so that the sequencer complementers 140 through 142 again have high outputs, thereby assuring that no outputs can occur from any of complementers 144*a* through 144*i*. In summary, the occurrence of a start sprocket on the line 114** signifies that the first pair of digits have been validly summed and that the summation is complete; and this start sprocket sends the next pair of digits to the adder, whereafter the sequencer outputs and adder inputs are returned to nothing.

The sequence thus described continues, and completion of each valid addition effects an operand register read-out of the next pair of signals to be summed. Eight additions are effected in sequence, in the manner described; and after valid completion of the eighth addition, amplifier **144*i* has all the inputs thereof at low potential whereby said amplifier 144*i* produces an ending pulse output on a control line 155. The ending pulse on the line 155 is passed through a pair of diodes to cause the A and B outputs to each represent binary zero, so that the adder permits the last carry to properly propagate. The pulse so appearing on the line 155** signals that the entire word addition has been completed whereafter the machine may commence a next program step.

The particular registers described in reference to FIG. 9 comprise a plurality of switches associated with each position of the register for manually selecting which of two binary signals is to be stored at that position in the register. As mentioned previously, however, the toggle switch registers 146—147 of FIG. 9 can be replaced by other forms of registers, and one such other register, adapted to store information in the two-line logic of the present invention, is shown in FIG. 10.

The register of FIG. 10 comprises plural pairs of cores **156*a*—156*b* through 163*a*—163*b* inclusive. Each pair of cores is associated with both read-in and read-out lines, whereby information signals can be stored in pairs and read out in pairs from each pair of cores. By way of example, it is noted that the pair of cores 156*a*—156*b* are associated with a pair of drive lines 164—165. The drive lines 164—165 are respectively coupled via diodes to a common control terminal 168; and to an amplifier 166 and a complementer 167. Drive lines 164—165 so link their respective cores 156*a*—156*b* that upon occurrence of an output from either amplifier 166 or complementer 167 concurrent with the pulsing of the terminal 168, a combination of pulses corresponding to either 1–0 or 0–1 is stored in the two cores 156*a* and 156*b* depending upon which of the two elements, amplifier 166 or complementer 167** is actually providing an output.

A similar network is associated with each of the other pairs of cores; and in particular, each such other pair of cores includes a pair of drive lines also coupled to the outputs of amplifier 166 and complementer 167 and associated with further control terminals such as 169, 170, etc.

In order to effect a read-in operation, signals being read into the register are produced in sequence at the outputs of amplifiers 166 and 167; and the several control terminals 168, 169, 170, etc. are stepped in sequence by a sequencer similar to that already described in reference to FIG. 9 and controlled synchronously with the read-in signals. For this read-in operation, therefore, a first pair of signals appears at the outputs of elements 166—167 simultaneous with the pulsing of terminal 168, whereby this first pair of signals is stored in cores **156*a*—156*b*. A second pair of signals appearing at the output of amplifiers 166—167 occurs concurrent with the pulsing of the terminal 169, whereupon this second pair of signals is stored in the cores 157*a*—157*b*; a third pair of pulses is stored in the cores 158*a*—158*b*, due to the pulsing of the terminal 170**, etc.

Each of the pairs of cores is also associated with a pair of read-out lines. By way of example, such a pair of read-out lines has been designated 171 and 172 in association with the pair of cores **156*a*—156*b* respectively. Read-out is accomplished by pulsing a drive line coupled to the two read-out lines 171—172; and the drive line associated with the first pair of cores has in fact been designated 145*a*** inasmuch as it is analogous to the drive line already described in reference to FIG.

9. Similarly, the read-out lines associated with the other pairs of cores have been designated **145*b* through 145*h* inclusive, inasmuch as they are also analogous to the lines of like notation already described in reference to FIG. 9; and indeed, the register shown in FIG. 10 could be substituted bodily for either of the registers 146—147 of FIG. 9, by coupling the drive lines in the manner shown in these two figures. Upon pulsing the several drive lines 145*a* through 145*h*** in sequence, destructive read-out occurs from the pair of cores associated with the particular drive line being pulsed; and an output is coupled to the *a—a'* output terminals via elements 150 or 151 in the manner already described in reference to FIG. 9.

In normal course, the adder of FIG. 8, sequencer of FIG. 9, and registers such as are shown in FIG. 10, are interconnected to one another to effect a two-line asynchronous adder unit operative to extract information from storage registers, to such said information in sequence, and to thereafter return the summed information to a sum register. A block diagram of such a unit is shown in FIG. 11.

In particular, this unit comprises a two-line adder 173 which may be similar to that described with reference to FIG. 8. The operand inputs to the adder 173 are derived from a pair of registers 174 and 175 (each of which may take the form already described in reference to FIG. 10) under the control of an arithmetic sequencer 176 constructed and operating in the manner already described in reference to FIG. 9. The machine further includes a memory 177 which may comprise any known memory of the magnetic or other type; and the said memory 177 is controlled by a memory sequencer 178 operating in a manner similar to that already described in reference to FIG. 9 for feeding arguments from the memory into the registers 174 and 175. The adder 173 produces sprocket pulses on line 179 (which is analogous to line 114 already described in reference to FIGS. 8 and 9); and the output of the said adder could further be fed to a sum register 180 which is operative to ultimately feed information back to the memory 177 or to another memory in the system.

In operation, the memory sequencer 178 receives a control pulse from the computer control circuit, whereupon the output lines of the sequencer 178 are caused to step in sequence in a manner similar to the stepping sequence described with reference to lines 168, 169, 170, etc. of FIG. 10. Information is read out of the memory 177 into the registers 174 and 175, e.g. via amplifiers such as 166–167 (FIG. 10); and when the arguments have been completely read into registers 174–175, the computer control circuits produce a start pulse on line 181 (analogous to line 130 of FIG. 9) of the arithmetic sequencer ous to line 130 of FIG. 9) of the arithmetic sequencer 176. This start pulse on line 181 steps the arithmetic sequencer to its first output sequence condition to read a first pair of operands out of the registers 174–175 into the adder 173. When a valid sum is produced by the adder 173, the result of the summation is fed to the sum register 180 and sprocket pulses are also produced on the line 179 to step the arithmetic sequencer to its second position. The second pair of operand signals are thereafter read out of registers 174–175 into the adder 173 whereupon the same procedure occurs.

The process continues, as has already been described, until the arithmetic sequencer 176 steps to its last position, thereby to produce an ending pulse on line 182 (analogous to line 155 of FIG. 9). This ending pulse, signifying the completion of the addition, can be employed to reinitiate operation of a memory sequencer such as 178 through the computer control circuits, to transfer the sum out of the sum register 180 to the memory, and to read new arguments from the memory 177 into the registers 174 and 175. It will be appreciated, of course, that in accordance with general practice, the sum stored in register 180, rather than being transferred back to the memory 177, can beta transferred into the cleared register 175, whereupon new infomation can be inserted into the cleared register 174 only so that the overall system operates as an accumulator. These latter operations are determined, of course, by the computer control circuits in response to predetermined instructions as will be described subsequently in reference to FIG. 15.

If one is to build an asynchronous arithmetic unit, something more elegant than the register of FIG. 10 is desired. An accumulator, of course, calls for a register from which an argument can be extracted and to which the result can be returned, in the manner already mentioned with reference to FIG. 11. This known concept of accumulation is in fact shown in FIG. 13, and it is noted that the outputs of registers X and Y are fed to an adder, whereafter the sum output of the adder is fed back into register X for purposes of accumulation. A register capable of use as register X of FIG. 13, and capable of operation as an accumulator, is shown in FIG. 12.

This particular form of register is generally analogous to the double core register already described with reference to FIG. 10; and comprises, as the arrangement of FIG. 10, a plurality of pairs of cores associated with both read-in and read-out lines. In the arrangement of FIG. 12, however, both the read-in and read-out lines are operated from a single sequencer, with the read-out lines that are pulsed during a given sequence step being associated with a pair of cores one step in advance of the read-in lines that are pulsed during that same sequence step. In order to illustrate this particular structure, it should be noted that the register of FIG. 12 includes a plurality of read-out lines 183, 184, 185 . . . n–2, n–1, n. The read-out line 184 is associated with a pair of cores **186*a*–186*b* for effecting read-out of these two cores; and is also coupled to the read-in lines 187*a*–187*b* associated with an adjacent pair of cores 188*a*–188*b*. Upon application of a pulse to line 184, therefore, information can be read into the cores 188*a*–188*b*; and information is simultaneously read out of the adjacent pair of cores 186*a*–186*b***.

In order to generalize this concept, it should be noted that when sequencer line n–1 is pulsed, cores N and N' are destructively read out, while cores N–1 and (N–1)' are conditioned for read-in. A register of the type shown in FIG. 12 can accordingly deliver a pair of signals *a—a'* to the adder (e.g. adder 173 of FIG. 11), and simultaneously receive the preceding sum *s—s'* (see FIG. 8), from the said adder.

The actual output of the register shown in FIG. 12 appears on a pair of lines 189–190, with these signals being fed via a control circuit comprising a pair of transistors 191–192 to amplifier 150, and complementer 151 already described in reference to FIG. 9, and thence to the *a—a'* output terminals of the register which act to give one input to the adder. The two transistors 191–192 are controlled as to conductivity by a control line 193 coupled to the control circuit of the computer, whereby the potential state on the line 193, as determined by the computer control, determines whether or not a register readout should occur.

The read-in to the register of FIG. 12 appears at terminals 195–195 and is derived from the *s—s'* output terminals of the adder (see FIG. 8). Summed signals are coupled via amplifier 196 and complementer 197 and via a further pair of transistors 198–199, controlled as to conductivity by the potential state on a line 200, to the read-in lines 201–202 of the register. The actual position in which the summed signals are stored in the register of FIG. 12 depends upon which of the sequencer lines is pulsed.

A "clear-to-zero" line 203 is also provided, and it is noted that this line 203 links all of the cores in the core pairs comprising the register of FIG. 12. The line 203 is pulsed by an appropriate circuit in the computer whenever all of the cores are to be cleared preparatory to the storage and accumulation of information.

A pair of lines, coupled to terminals 1401 and 1402, are threaded through the upper and lower rows of cores, 188*a*, 186*a*, . . . N–1, N, and 188*b*, 186*b*, . . . (N–1)′, N′, respectively. During a read-in operation, as an upper or lower core is set, corresponding signals are induced in the lines and appear at the terminals 1401, 1402.

Referring to FIG. 14, the terminals 1401, 1402 are coupled to a quarter adder 1403 (exclusive "or" circuit), which acts as a checker to indicate that information has been received correctly. The output of the quarter adder 1403 is coupled to step a sequencer 1404 which sequences signals to the memory 1405 and the register 1406. The output of the memory 1405 is coupled to the register 1406.

Similar to the logical arrangement described with reference to FIG. 2, the register 1406 upon readiness for a subsequent operation steps the sequencer 1404 via a two-line signal recognizer such as the quarter adder 1403. Therefore, the system described operates asynchronously at maximum speed.

In summary, it will be appreciated that the various logical circuits operate in an asynchronous manner, whereby the speed of operation of the circuits are limited solely by the circuit itself rather than by an external clock source. In one embodiment of this invention, the output of one circuit is detected to determine when no information is presented in order to cause subsequent signals to be applied to that circuit.

Various modifications may suggest themselves to those skilled in the art without departing from scope of this invention. For example, minor modifications can be made to cause the adder to subtract, as well as add, without requiring inventive teachings. Therefore, it is intended that this invention be limited solely by the appended claims.

What is claimed is:

1. A first and second line, each adapted to carry thereon one of two voltage levels, a third and fourth line, each adapted to carry thereon one of said two voltage levels, wherein a high voltage level on high first and second lines represents a first binary digit, a low voltage level on said first and second lines represent a second binary digit, a low and a high level on said first and second lines represent an absence of information, and a high and a low level on said first and second lines represent an excluded condition, and wherein corresponding voltage levels on said third and fourth lines represent corresponding designations, a first buffer-inverter coupled to said first and third lines, a second buffer-inverter coupled to said second and fourth lines, a fifth line coupled to the output of said second buffer-inverter, and a sixth line coupled to the output of said first buffer-inverter, whereby all the voltage levels on said fifth and sixth lines are each high when all the voltage levels on said first, second, third, and fourth lines are each low.

2. In combination, a first means for serially dispersing on a pair of lines binary voltage levels, wherein said pair of lines is capable of representing four states, i.e., 1–1, 1–0, 0–1, and 0–0, one of said states representing an excluded signal, a second of said states representing an absence of information, and the third and fourth of said states representing a "one" and "zero" information signals; a second means coupled to said pair of lines for performing arithmetic operations upon said information signals and providing output signals upon a second pair of lines therefrom; and a third means coupled to said second pair of lines for detecting the absence of information thereon, and coupled to said first means for dispersing a subsequent pair of binary levels to said second means.

3. In combination, in a logical information system, a first means including a first logical device adapted to provide output voltage levels indicative of binary data as well as output voltages indicative of an absence of data; a second means including a logical device coupled to the output of said first device for providing a logical operation upon said output voltage levels indicative of binary data, said second logical device providing output voltages therefrom indicative of binary data, and voltage levels indicative of an absence of binary data; and third means responsive to the output of said second device and coupled to said first device for causing the transfer of binary data from said first device to said second device.

References Cited by the Examiner

UNITED STATES PATENTS

| | | | |
|---|---|---|---|
| 2,846,142 | 8/1958 | Strachey et al. | 235—165 |
| 2,905,833 | 9/1959 | Miehle | 307—88 |
| 2,936,116 | 5/1960 | Adamson et al. | 235—165 |
| 2,954,480 | 9/1960 | Steagall | 307—88 |
| 2,965,296 | 12/1960 | Keen | 235—153 |
| 2,970,764 | 2/1961 | Deerhake et al. | 235—153 |
| 2,972,060 | 2/1961 | Torrey | 307—88 |
| 3,132,257 | 5/1964 | Yando | 307—88 |

OTHER REFERENCES

Pomerene, Register Transfer Check, IBM Technical Disclosure Bulletin, volume 1, No. 4, December 1958, pp. 18 and 19.

BERNARD KONICK, *Primary Examiner.*

IRVING SRAGOW, *Examiner.*

M. S. GITTES, J. W. MOFFITT, M. POKOTILOW, *Assistant Examiners.*